United States Patent Office 3,782,993
Patented Jan. 1, 1974

1

3,782,993
METHOD FOR THE PREPARATION OF SMALL MEDICAMENT PARTICLES
Gerhart Rothgang, Traisa Uber Darmstadt, and Gerhard Simon, Darmstadt, Germany, assignors to Rohm GmbH, Darmstadt, Germany
No Drawing. Filed Nov. 19, 1971, Ser. No. 200,585
Claims priority, application Germany, Nov. 25, 1970, P 20 57 853.4
Int. Cl. B44d 1/16
U.S. Cl. 117—100 A                                5 Claims

ABSTRACT OF THE DISCLOSURE

A method for forming medicated particles by alternately applying portions of a liquid and of a solid powdered medicament, insoluble in said liquid, to an agitated seed material, and drying said particles only after all said portions have been applied. If required, a liquid-soluble binder for said medicament may be present, either dissolved in the liquid or admixed as a powder with the medicament. Each portion of liquid is within the "critical liquid uptake" region of the powder portion next applied, said region being empirically determined for each system of liquid and medicament (and, if necessary, binder). Said region encompasses those mixtures of liquid and solid system components which have a consistency between stickiness, on the one hand, and a tendency to crumble, on the other.

---

The present invention relates to a method for preparing medicaments in the form of small particles.

Medicaments are often employed in the form of small particles, such as spherules, which are either taken orally in that form or are incorporated into a gelatin capsule and then administered. The medicament particles are commonly prepared by introducing a "seed" material, for example sugar crystals, crystals of the active ingredient, or a granulate which may contain the active medicament, into a coating kettle with a solution of a binder in a solvent to moisten the seed material. Then, sufficient medicament in powdered form is introduced such that the major portion of the powder adheres to the seed and a small portion of the powder remains behind in dry form between the particles, At this point the solvent, which is usually water or a water-alcohol mixture, is evaporated by blowing in air or introducing the material into a drying cabinet. The dry active ingredient remaining as a powder between the particles is then removed by sieving. This method, i.e. wetting, addition of the active ingredient in the form of a powder, drying, and sieving, is then repeated until a sufficiently large amount of the active ingredient has been deposited onto the seed material. As a rule, the content of effective ingredient in such particles is from 40 to 70 percent by weight if the seed material does not itself contain active ingredient.

The process just described is very time-consuming and requires much labor, particularly because of the drying and sieving steps. Nevertheless, the sieving cannot be avoided because loose powder, if present when further binder solution is added, forms so-called "wild seeds," resulting in a very heterogeneous distribution of particle sizes.

Also, the use of some excess of the powdered active ingredient cannot be avoided since the excess prevents the particles from adhering together on drying. If there is too great an excess of powder, the shell of effective agent is relatively dry and crumbly and can break off if the mass of particles is agitated. If particles are produced without an excess of the powdered active ingredient, the shell of active material is soft and plastic to an extent that the particles lose their spherical form, as well as their flowability, and tend to adhere in clumps.

Finally, drying after the application of each layer of effective material is also unavoidable, since the applied shell or layer has insufficient mechanical rigidity in its damp state.

According to the process of the present invention, small particles, such as spherules, of medicament having a high content of the active ingredient can be prepared without the prior art steps of drying and sieving. At the heart of the invention is the discovery that the powder which is or contains the active ingredient, when admixed with a certain quantity of liquid, takes on a consistency in which particles formed therefrom neither stick together nor deform, even in the absence of an excess of dry powder, nor do they break apart if the mass of particles is agitated. The amount of liquid which must be employed in order to reach the consistency described above in a given system comprising a solid medicament powder and a liquid in which the medicament is insoluble will be characterized hereinafter as the "critical liquid uptake." In those systems in which the medicament is sufficiently cohesive, a binder soluble in said liquid may be present, either dissolved in the liquid or admixed as a powder with said solid medicament. Where a binder is present, the "critical liquid uptake" is determined for the system comprising the medicament, binder, and liquid.

A feature of the present invention is the preparation of small medicated particles by the alternate treatment of a seed material, while said seed material is being agitated (e.g. suitably while being rotated in a coating kettle), with portions of a volatile liquid and of a powder containing the active ingredient such that each portion of liquid employed is within the critical liquid uptake region of the portion of powder next applied.

The critical liquid uptake, which is numerically expressed in grams of liquid per 100 grams of powder, is different for each system of individual components (medicament, liquid, and optional binder) and must be determined by preliminary tests described below. For rough orientation, a mass is prepared from the powder and liquid, which mass is neither sticky nor crumbles easily. From the ratio of liquid to powder determined in this manner, a number of further masses with a higher and lower liquid content are prepared with intensive kneading such that the end points of this series are, on the one hand, a distinctly sticky mass and on the other hand, a distinctly crumbly mass. The critical liquid uptake lies in the region defined by these end points. A mass prepared within this range of critical liquid uptake can be compressed into a solid ball which, when dropped from a height of 50 centimeters onto an even surface, will neither break open nor shatter nor be greatly deformed. A mass of this type detectably resists deformation: on rolling to form a rope, the mass breaks open and falls apart into large crumbs. The mass, when compressed into spheroidal form, can be broken into two portions with a sharp break-surface, without the formation of threads or strings prior to breaking. The two pieces can be fitted back together on the break-surfaces.

Those masses having a smaller liquid content form more than two pieces on breaking, whereas masses containing a larger quantity of liquid do not break through the entire body at one time, but form break-surfaces over a definite time period. That is, as long as the break is proceeding through the body, the portion which still remains unbroken is plastically deformed. In both of these latter cases, the broken pieces cannot be fitted together to rejoin them.

The test methods set forth in following table I serve better to define the region of the critical liquid uptake.

The testing bodies are suitably prepared by first preparing a mass which is clearly too moist, gradually working in dry powder over the range of the critical liquid uptake to form a mass which is clearly too dry, and then returning in the other direction by gradually working in more liquid into the mass which is too dry. In this manner, the region of critical liquid uptake is approached from both directions.

of a synthetic resin, or plant seeds such as rape seeds of a similar size can be employed.

An active substance can be used in pure form or can be mixed with other active materials or with neutral excipients. A mixture of several different active ingredients can be used or different active ingredients can be applied in different layers. If the seed material contains an active

| Test body and test method | Above the region of critical liquid uptake | Within the region of critical liquid uptake | Below the region of critical liquid uptake |
|---|---|---|---|
| A sphere about 5 cm. in diameter is dropped from a height of 50 centimeters onto a level surface. | Does not break; is deformed | Does not break; may be slightly compressed at the point of impact; at most may develop fine cracks. | Breaks apart or cracks badly. |
| A sphere about 5 centimeters in diameter is broken. | Breaks gradually with the formation of threads and strings; break surfaces do not fit together. | Breaks into two portions with sharply defined break surfaces which fit together. | Breaks into more than two particles; more or less crumbles. |
| A cylindrical rope about 1-2 centimeters in diameter is prepared by rolling (similar to the rolling of pills) | Plastic rope; no crack formation | The rope develops cracks; the mass cannot be rolled further. | Crumbly mass which cannot be rolled. |

The critical liquid uptake per 100 grams of powder generally has an order of magnitude of 10 to 30 grams. In specific system, the lower and upper limits of the critical liquid uptake region are separated by a factor of 10 to 20 percent; for example, they can be in a range from 20 to 22, or 20 to 24, grams of liquid per 100 grams of powder. Nevertheless, cases can arise in which the critical liquid uptake differs significantly from the values which are given hereby way of example. In the case of thixotropic or dilatant mixtures, the test methods described above can lead to erroneous results. In these cases the critical liquid uptake is determined with the greatest accuracy from the tendency of the mixture to be sticky or to crumble.

To carry out the present invention in practice, the amount of liquid to be used for each layer of active ingredient to be employed is so chosen that it is within the critical liquid uptake range of the amount of powder next to be applied. A slightly larger amount of liquid may be necessary at the beginning of the process if the seed material absorbs some of the liquid. When there is danger that a portion of the liquid will continuously be lost by evaporation, an amount of liquid lying near the upper limit of the critical region is advantageously chosen. The absolute amount of liquid in the individual additions should be chosen such that the particles to be coated are uniformly dampened but are not softened to a considerable extent. A division of the total amounts of liquid and powder to be used into 8 to 15 individual portions is generally suitable. However, the number of portions can be raised and the amount of material per portion decreased correspondingly. In this way, a more or less continual addition of liquid and powder can be attained. If the liquid is applied in equal portions, the solid is also.

The particles or spherules so formed are dry and do not adhere to each other, but nevertheless do not contain any loose powder on their surfaces. As soon as the powder mass is uniformly divided and the particles are nicely rounded, liquid and powder can be again added. Only when the total amount of liquid and powder has been used up are the particles dried by the introduction of air or in a drying cabinet. The particles which, prior to drying, can be crumbled under light pressure, solidify on drying. They can later be coated with other overcoating materials by conventional means known to the art.

Because of the elimination of the intermediate drying and sieving steps, the processing time for the preparation of a charge of completed medicament particles can be reduced to 2 to 4 hours by the process of the present invention from 8 hours using the methods of the prior art.

The process of the present invention can be carried out in practice with all of the active ingredients and excipients conventional for the preparation of medicament particles. As the seed material, sugar crystals or non-pareils of all sizes, but preferably from 0.5–1.5 mm. in diameter, or even smaller, can be employed. In the same manner, crystals or granules of the active ingredient, pearls or beads ingredient, this can be the same as or different from the active material in the surrounding shell.

As noted earlier, if the medicament per se is not sufficiently cohesive, the particles may be prepared using conventional binder materials such as sugar, polyvinyl alcohol, polyvinyl pyrrolidone, alginates, gum arabic, gelatin, and the like. The binder can be a portion of the powder component and/or can be dissolved in the liquid component. The relative amounts of binder and medicament used are either well known to those skilled in the art or can be very readily determined in a specific case. Weak binders such as sugar may be present—as known in the art—in amounts up to 80 percent by weight of the medicament. Other stronger binders, like those mentioned above, usually suffice in amounts from 0.5 to 10 percent by weight of active agent.

The liquid component is so chosen that it dissolves the binder but not the active ingredient. In many cases water or its mixtures with alcohols, such as isopropanol, or with acetone, is suitable. Easily vaporizable solvents shorten the drying time at the end of the process.

The particles or spherules prepared in this manner can be provided with colored or colorless lacquer or wax coatings, or with similar overcoatings which may, in addition, have some special effect on the release of the active ingredient contained therein. For instance, they can be resistant or semi-permeable to stomach juices and in this manner exert a temporal control on the release of the active ingredient. Particles of this type are filled into hard gelatin capsules by machines in the conventional manner.

A better understanding of the present invention and of its many advantages will be had by referring to the following specific examples given by way of illustration.

EXAMPLE 1

15 kilograms of sugar crystals having a diameter between 0.5 and 0.75 mm. are placed in a coating kettle. A finely-ground mixture of active ingredients comprising 15 parts by weight of amylobarbituric acid and 0.3 part by weight of polyvinyl pyrrolidone is used as the coating powder. As the liquid, a solution of 0.5 part by weight of polyvinyl pyrrolidone in 4 parts by weight of isopropyl alcohol and 5.5 parts by weight of water is employed.

Using the techniques and criteria described in detail earlier herein, it is determined that the critical liquid uptake of this system is about 18.8 grams of liquid/100 grams of powder.

To wet the seed material employed in this example, 0.3 kg. portions of liquid are used. Accordingly, each application of this amount of liquid (through a spray gun) is followed by the introduction of 1.6 kg. of powder into the kettle.

Applications of liquid and powder are repeated ten times until a total of 3 kg. of liquid and 16 kg. of powder are consumed. The particles are then sorted with a sieve and dried in a drying cabinet. The content of active ingredients of the preparation is about 49 percent.

EXAMPLE 2

Nonpareil seed material having a diameter between 0.5 and 0.75 mm. is obtained by suitable conventional granulation methods, for example by granulation through a sieve of a damp powder mixture containing an active ingredient, or by the formation of briquettes from such an active powder mixture. 15 kg. of this seed material is coated according to the process of Example 1.

Residual or excess material left over from the formation of the non-pareil seeds can, in certain cases, be milled and used directly as the coating powder.

What is claimed is:

1. A method for preparing medicated solid particles which comprises:
   (1) the step of applying a portion of a volatile liquid and then a portion of a powder comprising a solid medicament insoluble in said liquid to a seed material while agitating said seed material to form coated particles;
   (2) repeating step (1) without drying said coated particles between each successive performance of step (1), whereby the medicated solid particles desired are built up on said seed material by the successive deposition of medicament-containing layers thereon; and
   (3) then drying said resultant particles;
in which method the amount of liquid applied per portion in each of steps (1) and (2) is such that when admixed with that powder portion next applied, the mixture has a consistency in which particles formed therefrom do not stick together nor deform.

2. A method as in claim 1 wherein said particles are agitated by rotation, whereby medicated spherules are formed.

3. A method as in claim 1 wherein said seed material comprises said solid medicament.

4. A method as in claim 1 wherein said liquid additionally contains a binder for said solid medicament, said binder being soluble in said liquid.

5. A method as in claim 1 wherein said powder additionally contains a binder for said solid medicament, said binder being soluble in said liquid.

References Cited
UNITED STATES PATENTS 2,262,087   11/1941   Bartlett et al. _____ 424—35

WILLIAM D. MARTIN, Primary Examiner

D. C. KONOPACKI, Assistant Examiner

U.S. Cl. X.R.

117—100 B; 424—21